United States Patent
Sheu (10) Patent No.: US 8,655,481 B2
(45) Date of Patent: Feb. 18, 2014

(54) IMR (IN-MOLD ROLLER OR IN-MOLD RELEASE)/IMF (IN-MOLD FORMING) MAKING METHOD USING A DIGITAL PRINTER PRINTING AND PRE-FORMING TECHNIQUE

(75) Inventor: Victor Shi-Yueh Sheu, Taoyuan (TW)

(73) Assignees: Victor Shi-Yueh Sheu, Taoyuan (TW); Sheng-Li Hsu, New Taipei (TW)

( * ) Notice: Subject to any disclaimer, the term of this patent is extended or adjusted under 35 U.S.C. 154(b) by 985 days.

(21) Appl. No.: 12/757,319

(22) Filed: Apr. 9, 2010

(65) Prior Publication Data

US 2011/0251706 A1 Oct. 13, 2011

(51) Int. Cl.
 G06F 17/50 (2006.01)
 B29C 39/36 (2006.01)
 B29C 45/03 (2006.01)

(52) U.S. Cl.
 USPC ............................... 700/197; 700/119

(58) Field of Classification Search
 USPC .................... 700/97, 119, 197, 203
 See application file for complete search history.

(56) References Cited

U.S. PATENT DOCUMENTS

| | | | | |
|---|---|---|---|---|
| 6,300,042 B1 * | 10/2001 | Mancini et al. | ............... | 430/325 |
| 7,061,077 B2 * | 6/2006 | Joshi | ............... | 257/666 |
| 7,439,613 B2 * | 10/2008 | Joshi et al. | ............... | 257/678 |
| 7,504,281 B2 * | 3/2009 | Joshi | ............... | 438/106 |
| 7,682,877 B2 * | 3/2010 | Joshi et al. | ............... | 438/123 |
| 7,790,513 B2 * | 9/2010 | Joshi | ............... | 438/123 |
| 8,405,561 B2 * | 3/2013 | Handy et al. | ............... | 343/705 |
| 2006/0257785 A1 * | 11/2006 | Johnson | ............... | 430/270.1 |
| 2008/0012154 A1 * | 1/2008 | Chang | ............... | 257/787 |

* cited by examiner

*Primary Examiner* — Charles Kasenge
(74) *Attorney, Agent, or Firm* — Pai Patent & Trademark Law Firm; Chao-Chang David Pai (57) ABSTRACT

An IMR (in-mold roller or in-mold release)/IMF (in-mold forming) making method using a digital printer printing and pre-forming technique is disclosed to employ a digital printing technique to prepare a release layer, a protective wear-resistance layer (durable layer), an ink pattern layer, a metal pattern layer and a bonding layer (adhesive layer). In-mold roller or in-mold forming film is shaped and then molded on a plastic material through an injection-molding or pressure-casting technique so that the finished product is obtained after release from the mold and removal of the outer base layer. Further, shaped in-mold decoration film is put in an injection-molding mold or pressure-casting mold for molding and then the molded product is cut into the desired shape, finishing the fabrication. Trimming process may be applied to the shaped in-mold forming film before injection molding or pressure casting.

14 Claims, 6 Drawing Sheets

IMR (IN-MOLD ROLLER OR IN-MOLD RELEASE)/IMF (IN-MOLD FORMING) MAKING METHOD USING A DIGITAL PRINTER PRINTING AND PRE-FORMING TECHNIQUE

BACKGROUND OF THE INVENTION (a) Field of the Invention

The present invention relates to the fabrication of in-mold roller films and more particularly, to an IMR (in-mold roller or in-mold release)/IMF (in-mold forming) making method using a digital printer printing and pre-forming technique.

(b) Description of the Prior Art

Conventionally, IMR (in-mold roller or in-mold release)/IMF (in-mold forming) films are made by means of using a screening printing technique or rotogravure letter printing technique to prepare the desired pattern and then using a press or coating machine to make the desired release layer, protective wear-resistance layer (durable layer), ink pattern layer, metal pattern layer, bonding layer (adhesive layer) and any other patterned layer. The press, coating machine, screen printer and rotogravure letter printing machine are open type machines that are kept in contact with the outside open air during operation. Thus, the fabrication of IMR (in-mold roller or in-mold release)/IMF (in-mold forming) films will produce waste water, waste gas and other solid waste materials. Disposing off these waste materials is complicated. Further, when making a product carrying an IMR film according to the prior art, the IMR film is not shape-formed prior to the molding of the desired product. During fabrication, the planar IMR film is directly put in the molding mold and then molded on the molten material in the molding mold. During molding, the IMR film may be caused to crack or wrinkle, producing a defective product. Therefore, conventional IMR (in-mold roller or in-mold release)/IMF (in-mold forming) techniques cannot satisfy the demand for the fabrication of high-quality three-dimensional and environment-friendly products.

SUMMARY OF THE INVENTION

The present invention has been accomplished under the circumstances in view. It is one object of the present invention to provide an IMR (in-mold roller or in-mold release)/IMF (in-mold forming) making method, which employs a digital printing technique to prepare a release layer, a protective wear-resistance layer (durable layer), an ink pattern layer, a metal pattern layer and a bonding layer (adhesive layer), eliminating the drawbacks of conventional printing and coating techniques, satisfying environmental protection requirement. It is another object of the present invention to provide an IMR (in-mold roller or in-mold release)/IMF (in-mold forming) making method, which incorporates with a shape forming step, a molding (casting) step and mold-release and release layer removal step, enabling an in-mold roller film to be applied to a three-dimensional product having a grooved or ribbed surface, or any product that has a small side angle or fillet, avoiding cracking or wrinkling of the in-mold roller film during the injection-molding or pressure-casting process, so that the finished product is assured to provide a smooth surface.

To achieve these and other objects of the present invention, an IMR (in-mold roller or in-mold release)/IMF (in-mold forming) making method includes the steps of: (1) operating a computer print a release layer on one side of a substrate through a color laser printer or color inkjet printer; (2) printing a protective wear-resistance layer (durable layer) on one side of the release layer opposite to the substrate by means of the digital color laser printer or digital color inkjet printer; (3) printing an ink pattern layer on one side of the protective wear-resistance layer (durable layer) opposite to the release layer by means of the digital color laser printer or digital color inkjet printer; (4) forming a metal pattern layer on the ink pattern layer by means of a semiconductor lithographic, evaporation or sputter technique; (5) printing a bonding layer (adhesive layer) on said metal pattern layer, thereby obtaining an in-mold roller film; (6) shape-forming the in-mold roller film into a shaped in-mold roller film subject to the shape of the product to be made; (7) molding the in-mold roller film on a material to form a molded product; and (8) releasing the molded product from the injection-molding mold or pressure-casting mold, and then removing the substrate and the release layer from the in-mold roller film of the molded product.

Further, the step of molding the in-mold roller film on a material to form a molded product can be: molding the in-mold roller film on a plastic material through an injection-molding by means of putting the in-mold roller film in an injection-molding mold and then pouring a predetermined plastic material in the injection-molding mold for molding into a molded product.

Alternatively, the step of molding the in-mold roller film on a material to form a molded product can be: molding the in-mold roller film on a metallic material through a pressure-casting technique by means of putting the in-mold roller film in a pressure-casting mold and then pouring a predetermined molten metallic material in the pressure-casting mold for casting into a molded product.

To achieve these and other objects of the present invention, an IMR (in-mold roller or in-mold release)/IMF (in-mold forming) making method includes the steps of: (1) operating a computer print a protective wear-resistance layer (durable layer) on one side of a substrate; (2) printing an ink pattern layer on the other side of the substrate by means of the digital color laser printer or digital color inkjet printer; (3) forming a metal pattern layer on the ink pattern layer by means of a semiconductor lithographic, evaporation or sputter technique;

(4) printing a bonding layer (adhesive layer) on the metal pattern layer by means of the digital color laser printer or digital color inkjet printer, thereby obtaining an in-mold roller film; (5) shape-forming the in-mold roller film into a shaped in-mold roller film subject to the shape of the product to be made by means of hot embossing, vacuum forming or high-pressure forming techniques; (6) molding the in-mold roller film on a material by an injection-molding mold or pressure-casting mold to form a molded product; and (7) releasing the molded product from the injection-molding mold or pressure-casting mold; and (8) trimming the molded product into the desired shape and size.

By means of the aforesaid digital color laser printer or digital color inkjet printer to print the release layer, the protective wear-resistance layer (durable layer), the ink pattern layer and bonding layer (adhesive layer) under an enclosed environment, the invention achieves fully green manufacturing process. In-mold roller films made according to the present invention can then be used in a plastic injection molding fabrication process to make different green information products having glossy, even and smooth colorful characteristics.

Further, the patterns of the release layer, the protective wear-resistance layer (durable layer), the ink pattern layer and bonding layer (adhesive layer) can be designed by a computer, simplifying the fabrication and cost. This IMR (in-mold roller or in-mold release)/IMF (in-mold forming)

making method avoids cracking or wrinkling of the in-mold roller film, and therefore the finished product will have a smooth surface.

DETAILED DESCRIPTION OF THE PREFERRED EMBODIMENTS

Figure 1:
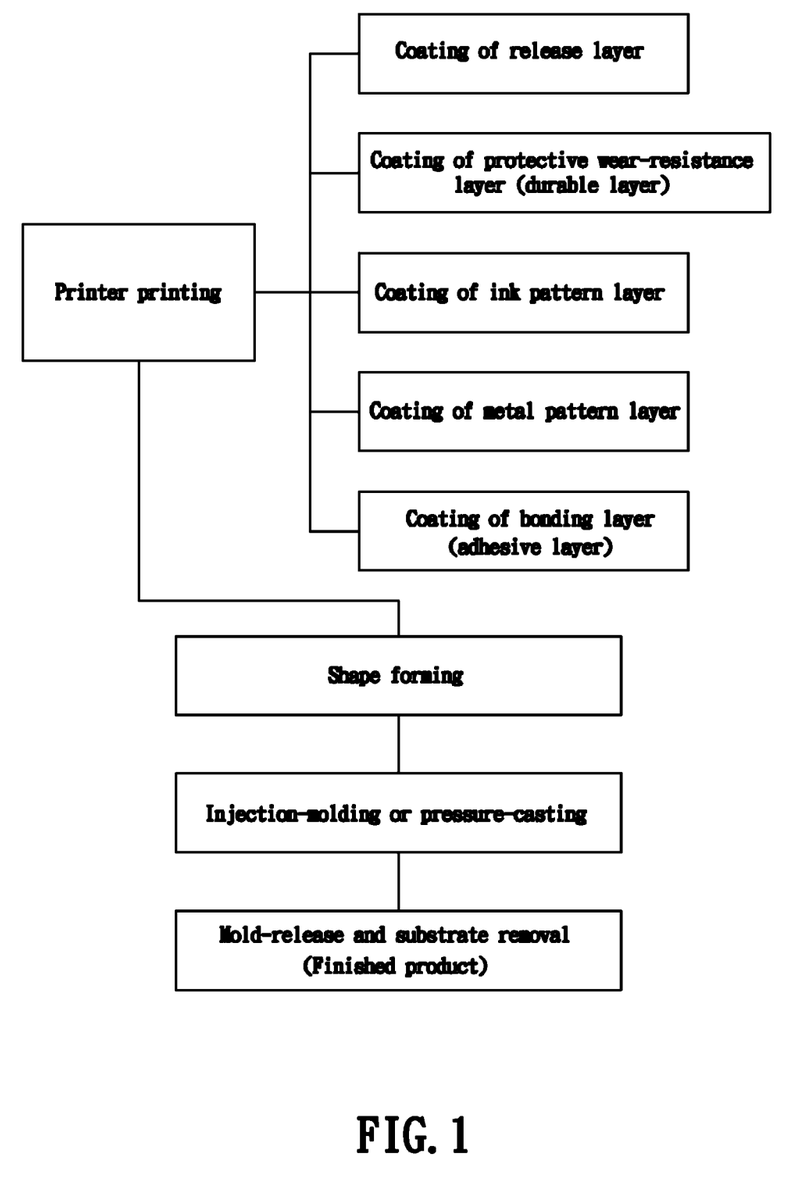
FIG. 1 is a flow chart of an IMR in-mold roller or in-mold release making method in accordance with a first embodiment of the present invention.
Figure 2:
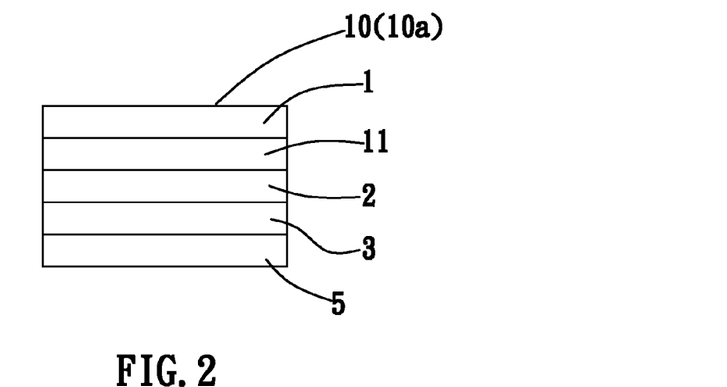
FIG. 2 is a sectional view of an in-mold roller film made subject to an IMR (in-mold roller or in-mold release) making method in accordance with the first embodiment of the present invention.
Figure 3:
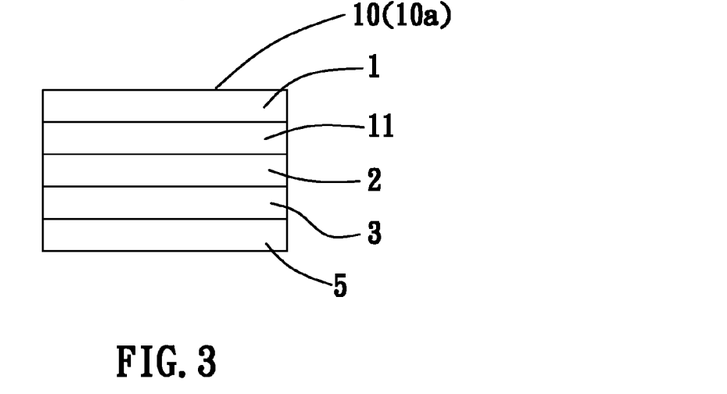
FIG. 3 is a sectional view of an alternate form of the in-mold roller film made subject to the IMR (in-mold roller or in-mold release) making method in accordance with the first embodiment of the present invention.
Figure 4:
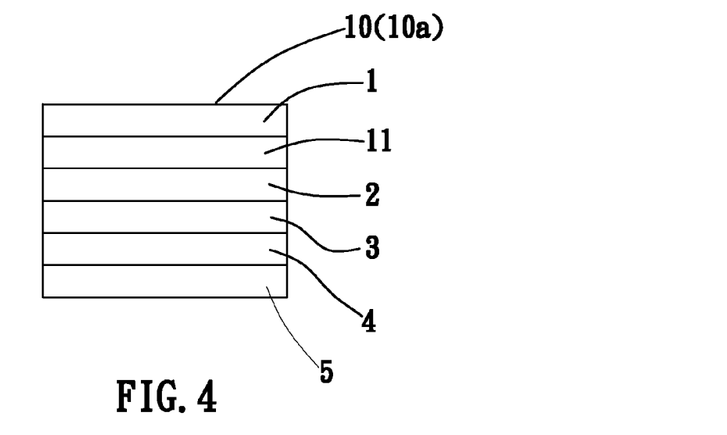
FIG. 4 is a sectional view of another alternate form of the in-mold roller film made subject to an IMR (in-mold roller or in-mold release) making method in accordance with the first embodiment of the present invention.

FIG. 1 is a flow chart of an IMR (in-mold roller or in-mold release) making method in accordance with a first embodiment of the present invention. An in-mold roller film 10 made according to this first embodiment, as shown in FIGS. 2-3, comprises a substrate 1 that can be prepared from opaque or transparent paper, rubber or plastics, a protective wear-resistance layer (durable layer) 2 formed on one side of the substrate 1, an ink pattern layer 3 formed on one side of the protective wear-resistance layer (durable layer) 2 opposite to the substrate 1, a bonding layer (adhesive layer) 5 formed on one side of the ink pattern layer 3 opposite to the protective wear-resistance layer (durable layer) 2, and a release layer 11 sandwiched in between the substrate 1 and the protective wear-resistance layer (durable layer) 2. Further, a metal pattern layer 4 may be sandwiched in between the ink pattern layer 3 and the bonding layer (adhesive layer) 5, as shown in FIG. 4.

Figure 5:
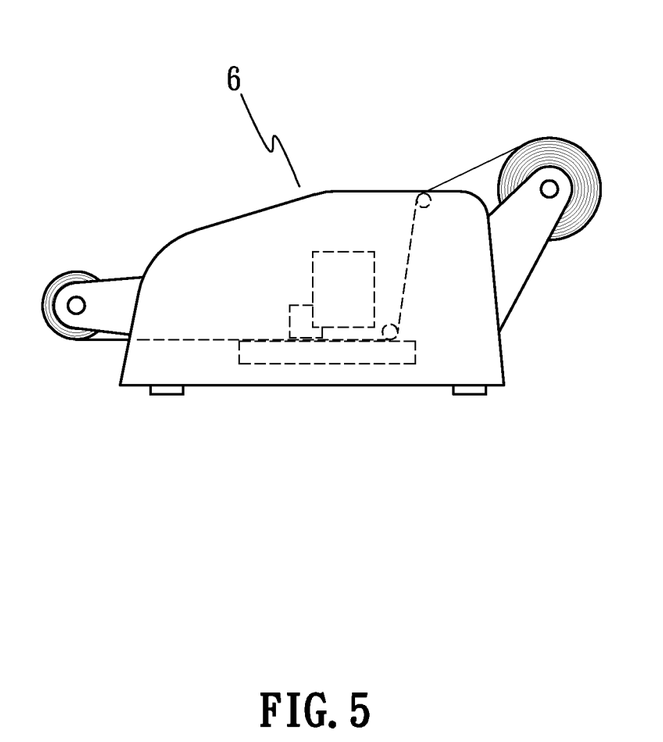
FIG. 5 is a schematic drawing showing a digital printer printing step during the fabrication of an in-mold roller in accordance with the present invention.

The substrate 1 can be prepared from opaque or transparent paper, or opaque or transparent rubber or plastic materials, such as polyethylene terephthalate (PET), polymethyl methacrylate (PMMA), polycarbonate (PC) or polystyrene (PS). The protective wear-resistance layer (durable layer) 2 is a transparent, color or colorless inorganic resin layer formed on the surface of the substrate 1. The release layer 11 can be a transparent, color or colorless inorganic resin layer formed in between the substrate 1 and the protective wear-resistance layer (durable layer) 2. The ink pattern layer 3 is designed subject to the desired pattern through a computer and then directly printed on the protective wear-resistance layer (durable layer) 2 by means of a digital color laser printer 6 (see FIG. 5) or a digital color inkjet printer that is connected to the computer. The bonding layer (adhesive layer) 5 is designed subject to the desired pattern through the computer and then directly printed on the ink pattern layer 3 by the digital color laser printer 6 or digital color inkjet printer.

By means of the aforesaid digital color laser printer 6 or digital color inkjet printer to print the ink pattern layer 3 and bonding layer (adhesive layer) 5 under an enclosed environment, the invention achieves fully green manufacturing process. In-mold roller films made according to the present invention can then be used in a plastic injection molding fabrication process to make different green information products having glossy, even and smooth colorful characteristics.

Referring to FIG. 1 again, an IMR (in-mold roller or in-mold release) making method using a digital printer printing and pre-forming technique in accordance with the first embodiment of the present invention includes the steps of:

(1) using a computer to design a patter form release layer and then operating a digital color laser printer 6 (see FIG. 5) or digital color inkjet printer being connected to the computer to print the designed release layer 11 on one side of a substrate 1;

(2) operating the computer to design a pattern for protective wear-resistance layer (durable layer) and then to control the connected digital color laser printer 6 or digital color inkjet printer to print the designed protective wear-resistance layer (durable layer) 2 on one side of the release layer 11 opposite to the substrate 1;

(3) operating the computer to design a pattern for ink pattern layer and then to control the connected digital color laser printer 6 or digital color inkjet printer to print the designed ink pattern layer 3 on one side of the protective wear-resistance layer (durable layer) 2 opposite to the release layer 11;

(4) forming a metal pattern layer 4 on the ink pattern layer 3 by means of using digital color laser printer 6 or digital color inkjet printer or screen printer to print a photoresist on the ink pattern layer 3 and then depositing the desired metal pattern layer 4 on the ink patter layer 3 by means of a semiconductor lithographic technique such as vapor deposition, sputtering, chemical evaporation or the like, and then removing the photoresist;

(5) operating the computer to drive the connected digital color laser printer 6 or digital color inkjet printer to print a bonding layer (adhesive layer) on the metal pattern layer 4, thereby obtaining an in-mold roller film 10;

(6) shape-forming the in-mold roller film 10 into a shaped in-mold roller film 10a subject to the shape of the product to be made by means of hot embossing, vacuum forming or high-pressure forming techniques;

(7) molding the in-mold roller film 10a on a plastic material through an injection-molding or a metallic material through a pressure-casting technique by means of putting the in-mold roller film 10a in an injection-molding mold or pressure-casting mold and then pouring a predetermined molten plastic material in the injection-molding mold or a predetermined molten metallic material in the pressure-casting mold for molding or casting into a molded product; and (8) releasing the molded product from the injection-molding mold or pressure-casting mold, and then removing the substrate 1 and the release layer 11 from the in-mold roller film 10a of the molded product, obtaining the desired finished product that carries the in-mold roller film 10a consisting of the protective wear-resistance layer (durable layer) 2 the ink pattern layer 3, the metal pattern layer 4 and the bonding layer (adhesive layer) 5.

Figure 6:
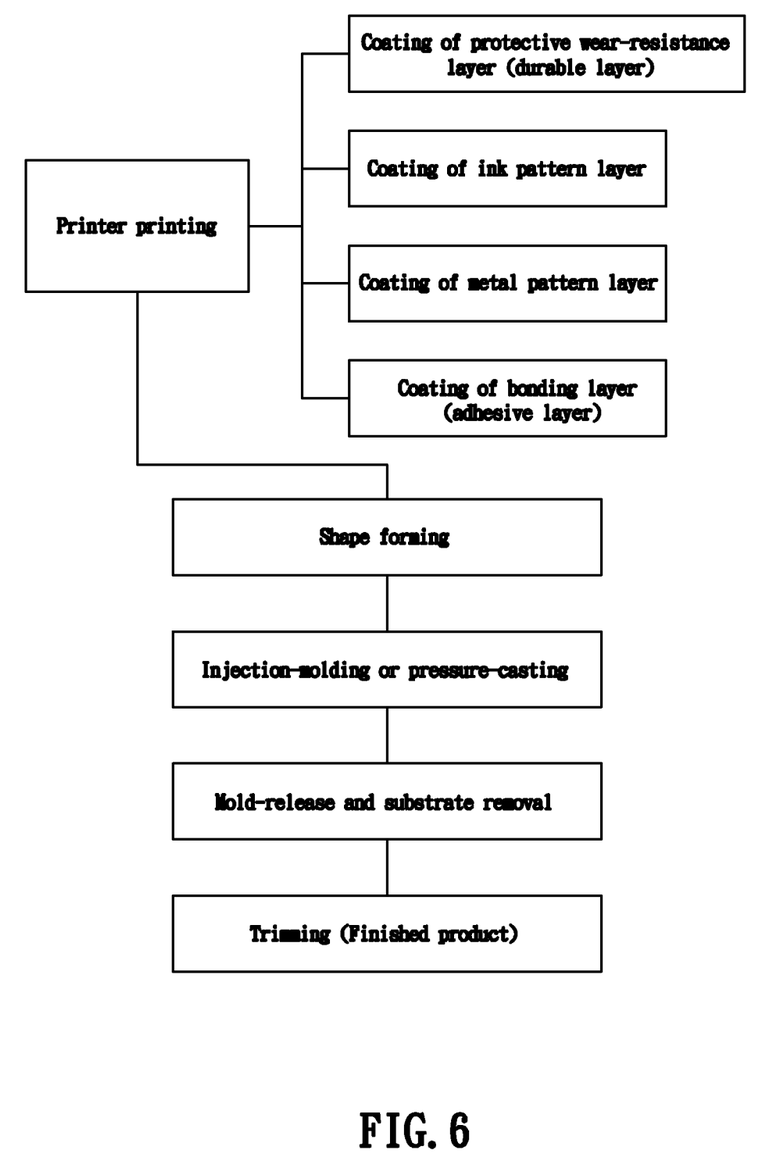
FIG. 6 is a flow chart of an IMF (in-mold forming) making method in accordance with a second embodiment of the present invention.
Figure 8:
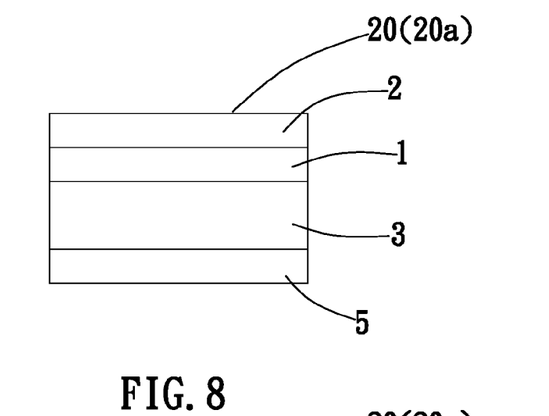
FIG. 8 is a sectional view of an IMF (in-mold forming) making method in accordance with the second embodiment of the present invention.
Figure 9:
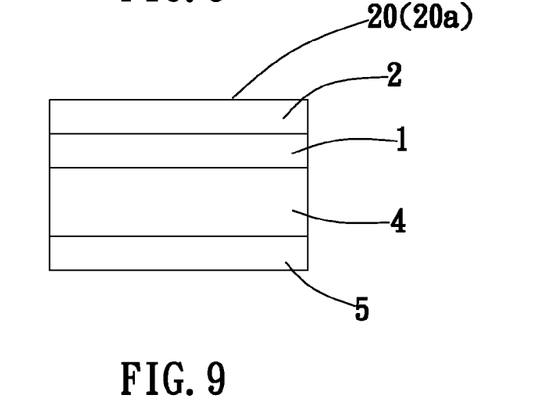
FIG. 9 is a sectional view of an alternate form of the IMF (in-mold forming) making method in accordance with the second embodiment of the present invention.
Figure 10:
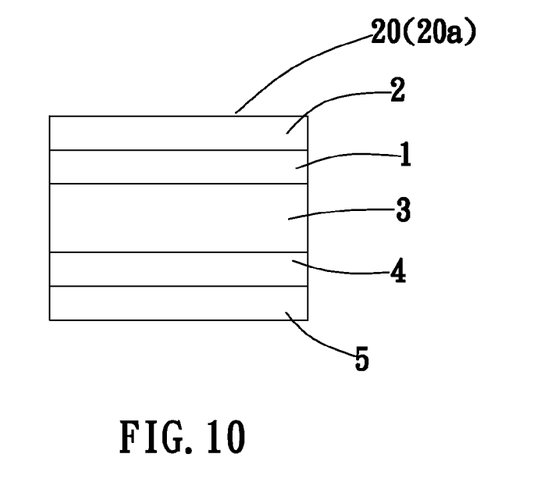
FIG. 10 is a sectional view of another alternate form of the IMF (in-mold forming) making method in accordance with the second embodiment of the present invention.

FIG. 6 is a flow chart of the fabrication of an IMF (in-mold forming) making method in accordance with a second embodiment of the present invention. An in-mold forming film 20 made according to this second embodiment, as shown in FIGS. 8-10, comprises a substrate 1 that can be prepared from opaque or transparent paper, rubber or plastics, a protective wear-resistance layer (durable layer) 2 formed on one side of the substrate 1, an ink pattern layer 3 formed on an opposite side of the substrate 1, a metal pattern layer 4 formed on one side of the ink pattern layer 3 opposite to the substrate 1, and a bonding layer (adhesive layer) 5 formed on one side of the metal pattern layer 4 opposite to the ink pattern layer 3.

The substrate 1 can be prepared from opaque or transparent paper, or opaque or transparent rubber or plastic materials, such as polyethylene terephthalate (PET), polymethyl methacrylate (PMMA), polycarbonate (PC) or polystyrene (PS). The protective wear-resistance layer (durable layer) 2 is a transparent, color or colorless inorganic resin layer formed on the surface of the substrate 1. The ink pattern layer 3 is designed subject to the desired pattern through a computer and then directly printed on the substrate 1 by means of a digital color laser printer 6 (see FIG. 5) or a digital color inkjet printer that is connected to the computer. The metal pattern layer 4 is formed on the ink pattern layer 3 by means of a semiconductor lithographic, evaporation or sputter technique. The bonding layer (adhesive layer) 5 is designed subject to the desired pattern through the computer and then directly printed on the metal pattern layer 4.

Referring to FIG. 6 again, an IMF (in-mold forming) making method using a digital printer printing and pre-forming technique in accordance with the second embodiment of the present invention includes the steps of:

(1) using a computer to design a patter form protective wear-resistance layer (durable layer) and then operating a digital color laser printer 6 (see FIG. 5) or digital color inkjet printer being connected to the computer to print the designed protective wear-resistance layer (durable layer) 2 on one side of a substrate 1;

(2) operating the computer to design a pattern for ink pattern layer and then to control the connected digital color laser printer 6 or digital color inkjet printer to print the designed ink pattern layer 3 on the other side of the substrate 1;

(3) forming a metal pattern layer 4 on the ink pattern layer 3 by means of using digital color laser printer 6 or digital color inkjet printer or screen printer to print a photoresist on the ink pattern layer 3 and then depositing the desired metal pattern layer 4 on the ink patter layer 3 by means of a semiconductor lithographic technique such as vapor deposition, sputtering, chemical evaporation or the like, and then removing the photoresist;

(4) operating the computer to drive the connected digital color laser printer 6 or digital color inkjet printer to print a bonding layer (adhesive layer) on the metal pattern layer 4, thereby obtaining an in-mold forming film 20;

(5) shape-forming the in-mold forming film 20 into a shaped in-mold forming film 20a subject to the shape of the product to be made by means of hot embossing, vacuum forming or high-pressure forming techniques;

(6) molding the in-mold forming film 20a on a plastic material through an injection-molding or a metallic material through a pressure-casting technique by means of putting the in-mold forming film 20a in an injection-molding mold or pressure-casting mold and then pouring a predetermined molten plastic material in the injection-molding mold or a predetermined molten metallic material in the pressure-casting mold for molding or casting into a molded product; and (7) releasing the molded product from the injection-molding mold or pressure-casting mold, obtaining a molded product that carries the in-mold forming film 20a consisting of the substrate 1, the protective wear-resistance layer (durable layer) 2, the ink pattern layer 3, the metal pattern layer 4 and the bonding layer (adhesive layer) 5; and (8) trimming the molded product into the desired shape and size, for example, cutting off the undesired edge of the in-mold forming film 20a of the molded product, and thereby obtaining the final finished product.

Figure 7:
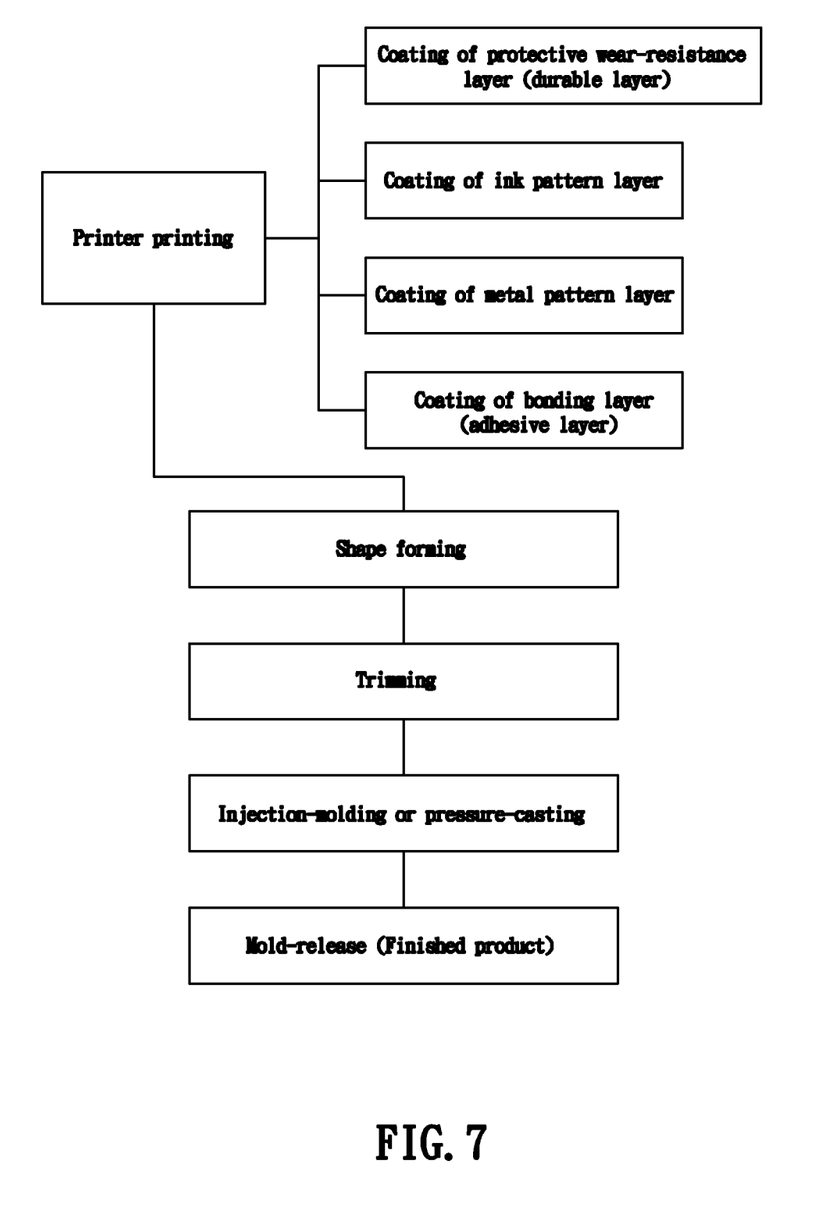
FIG. 7 is a flow chart of an IMF (in-mold forming) making method in accordance with a third embodiment of the present invention.

FIG. 7 is a flow chart of the fabrication of an in-mold forming film by means of an IMF (in-mold forming) making method in accordance with a third embodiment of the present invention. This third embodiment is substantially similar to the aforesaid second embodiment with the exception that the trimming step is performed immediately after the molding step prior to the shape-forming step. The final finished product has the transparent (or opaque) substrate 1 bonded to the outside wall thereof and protected by the protective wear-resistance layer (durable layer) 2.

Subject to the application of the aforesaid procedures, an in-mold forming film can be applied to a three-dimensional product having a grooved or ribbed surface, or any product that has a small side angle or fillet, and the in-mold forming film will be crack or wrinkle during the injection-molding or pressure-casting process, and therefore the finished product will have a smooth surface.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An IMR (in-mold roller or in-mold release) making method, comprising the steps of:

(1) using a computer to design a pattern form release layer and then operating a digital color laser printer or digital color inkjet printer being connected to said computer to print a designed release layer on one side of a substrate;

(2) operating said computer to design a pattern for protective wear-resistance layer and then to control said digital color laser printer or digital color inkjet printer to print the designed protective wear-resistance layer on one side of said release layer opposite to said substrate;

(3) operating said computer to design a pattern for ink pattern layer and then to control the connected digital color laser printer or digital color inkjet printer to print the designed ink pattern layer on one side of said protective wear-resistance layer opposite to said release layer;

(4) forming a metal pattern layer on said ink pattern layer by means of using a digital color laser printer or digital color inkjet printer or screen printer to print a photoresist on the ink pattern layer and then depositing the metal pattern layer on said ink pattern layer by means of a semiconductor lithographic technique, and then removing said photoresist;

(5) operating said computer to drive the connected digital color laser printer or digital color inkjet printer to print a bonding layer on said metal pattern layer, thereby obtaining an in-mold roller film;

(6) shape-forming said in-mold roller film into a shaped in-mold roller film according to the shape of the product to be made;

(7) molding said in-mold roller film on a material in a mold to form a molded product; and (8) releasing the molded product from the mold, and then removing said substrate and said release layer from the in-mold roller film of the molded product, obtaining a finished product that carries the in-mold roller film consisting of said protective wear-resistance layer, said ink pattern layer, said metal pattern layer and said bonding layer.

2. The IMR (in-mold roller or in-mold release) making method, as claimed in claim 1, wherein said substrate is prepared from opaque or transparent paper, or opaque or transparent rubber or plastic materials; said protective wear-resistance layer is a transparent, color or colorless inorganic resin layer formed on the surface of the substrate; said release layer is a transparent, color or colorless inorganic resin layer formed in between said substrate and said protective wear-resistance layer; said ink pattern layer is designed using the computer and then directly printed on said protective wear-resistance layer by means of the digital color laser printer or digital color inkjet printer that is connected to said computer; said bonding layer is designed using the computer and then directly printed on said ink pattern layer by said digital color laser printer or digital color inkjet printer.

3. The IMR (in-mold roller or in-mold release) making method, as claimed in claim 1, wherein the step (7) of molding said in-mold roller film to form a molded product is to mold said in-mold roller film on a plastic material through an injection-molding by means of putting the in-mold roller film in an injection-molding mold and then pouring a predetermined plastic material in the injection-molding mold for molding into a molded product.

4. The IMR (in-mold roller or in-mold release) making method, as claimed in claim 1, wherein the step (7) of molding said in-mold roller film to form a molded product is to mold said in-mold roller film on a metallic material through a pressure-casting technique by means of putting the in-mold roller film in a pressure-casting mold and then pouring a predetermined molten metallic material in the pressure-casting mold for casting into a molded product.

5. The IMR (in-mold roller or in-mold release) making method, as claimed in claim 1, wherein the step (6) is performed by means of hot embossing, vacuum forming or high-pressure forming techniques.

6. The IMR (in-mold roller or in-mold release) making method as claimed in claim 1, wherein the semiconductor lithographic technique in the step (4) is vapor deposition, sputtering or chemical evaporation.

7. The IMR (in-mold roller or in-mold release) making method as claimed in claim 2, wherein the plastic materials comprise polyethylene terephthalate (PET), polymethyl methacrylate (PMMA), polycarbonate (PC) or polystyrene (PS).

8. An IMF (in-mold forming) making method, comprising the steps of:

(1) using a computer to design a pattern form protective wear-resistance layer and then operating a digital color laser printer or digital color inkjet printer being connected to said computer to print the designed protective wear-resistance layer on one side of a substrate;

(2) operating said computer to design a pattern for ink pattern layer and then to control the connected digital color laser printer or digital color inkjet printer to print the designed ink pattern layer on the other side of said substrate;

(3) forming a metal pattern layer on said ink pattern layer by means of using a digital color laser printer or digital color inkjet printer or screen printer a photoresist on the ink pattern layer and then depositing the metal pattern layer on said ink pattern layer by means of a semiconductor lithographic technique, and then removing said photoresist;

(4) operating said computer to drive said connected digital color laser printer or digital color inkjet printer to print a bonding layer on said metal pattern layer, thereby obtaining an in-mold forming film;

(5) shape-forming said in-mold forming film into a shaped in-mold forming film according to the shape of the product to be made;

(6) molding said in-mold forming film on a material in a mold to form a molded product; and (7) releasing the molded product from the mold, obtaining a molded product that carries the in-mold forming film consisting of said substrate, said protective wear-resistance layer, said ink pattern layer, said metal pattern layer and said bonding layer; and (8) trimming the molded product.

9. The IMF (in-mold forming) making method, as claimed in claim 8, wherein said substrate is prepared from opaque or transparent paper, or opaque or transparent rubber or plastic materials; said protective wear-resistance layer is a transparent, color or colorless inorganic resin layer formed on the surface of the substrate; said release layer is a transparent, color or colorless inorganic resin layer formed in between said substrate and said protective wear-resistance layer; said ink pattern layer is designed using the computer and then directly printed on said protective wear-resistance layer by means of the digital color laser printer or digital color inkjet printer that is connected to said computer; said bonding layer is designed using the computer and then directly printed on said ink pattern layer by said digital color laser printer or digital color inkjet printer.

10. The IMF (in-mold forming) making method, as claimed in claim 8, wherein the step (6) of molding said in-mold forming film on a material to form a molded product is to mold in-mold forming film on a plastic material through an injection-molding by means of putting the in-mold forming film in an injection-molding mold and then pouring a predetermined plastic material in the injection-molding mold for molding into a molded product.

11. The IMF (in-mold forming) making method, as claimed in claim 8, wherein the step (6) of molding said in-mold forming film on a material to form a molded product is to mold said in-mold forming film on a metallic material through a pressure-casting technique by means of putting the in-mold forming film in a pressure-casting mold and then pouring a predetermined molten metallic material in the pressure-casting mold for casting into a molded product.

12. The IMF (in-mold forming) making method, as claimed in claim 8, wherein the step (5) is performed by means of hot embossing, vacuum forming or high-pressure forming techniques.

13. The IMF (in-mold forming) making method as claimed in claim 8, wherein the semiconductor lithographic technique in the step (3) is vapor deposition, sputtering or chemical evaporation.

14. The IMF (in-mold forming) making method as claimed in claim 9, wherein the plastic materials comprise polyethylene terephthalate (PET), polymethyl methacrylate (PMMA), polycarbonate (PC) or polystyrene (PS).

\* \* \* \* \*